United States Patent [19]

Keyes et al.

[11] 3,898,866

[45] Aug. 12, 1975

[54] SINGLE-STAGE PROPORTIONING PUMP

[75] Inventors: Richard M. Keyes, Rockford; Bertel S. Nelson, Naperville, both of Ill.

[73] Assignee: Beatrice Foods Co., Chicago, Ill.

[22] Filed: Sept. 9, 1974

[21] Appl. No.: 504,526

[52] U.S. Cl. ..................... 62/306; 261/82; 417/503
[51] Int. Cl. ............................................... B01f 3/04
[58] Field of Search ............ 62/306, 69, 70; 261/81, 261/82; 417/503

[56] References Cited
UNITED STATES PATENTS

| | | | |
|---|---|---|---|
| 2,672,089 | 3/1954 | Johnson | 261/82 X |
| 3,272,132 | 9/1966 | Stoelting et al. | 62/69 X |
| 3,822,964 | 7/1974 | Berglund et al. | 62/306 X |
| 3,829,242 | 8/1974 | Duke et al. | 417/38 |

Primary Examiner—William E. Wayner
Assistant Examiner—William E. Tapolcai, Jr.
Attorney, Agent, or Firm—Morsbach & Pillote

[57] ABSTRACT

The pump is particularly adapted for use on a soft ice cream machine or the like having a freezing compartment and a liquid reservoir. The pump sucks in air and liquid comestible simultaneously and delivers them to the freezing compartment. The structure includes an upright cylinder, a lower plug, and a piston. The air inlet is through the movable piston, while the liquid inlet and the liquid-air outlet are through the stationary plug. The pump is removably mounted for ease in cleaning. Likewise the plug and piston are readily removed. Removable and interchangeable O-rings seals and resilient band check valves also aid in cleaning and reassembling.

12 Claims, 7 Drawing Figures

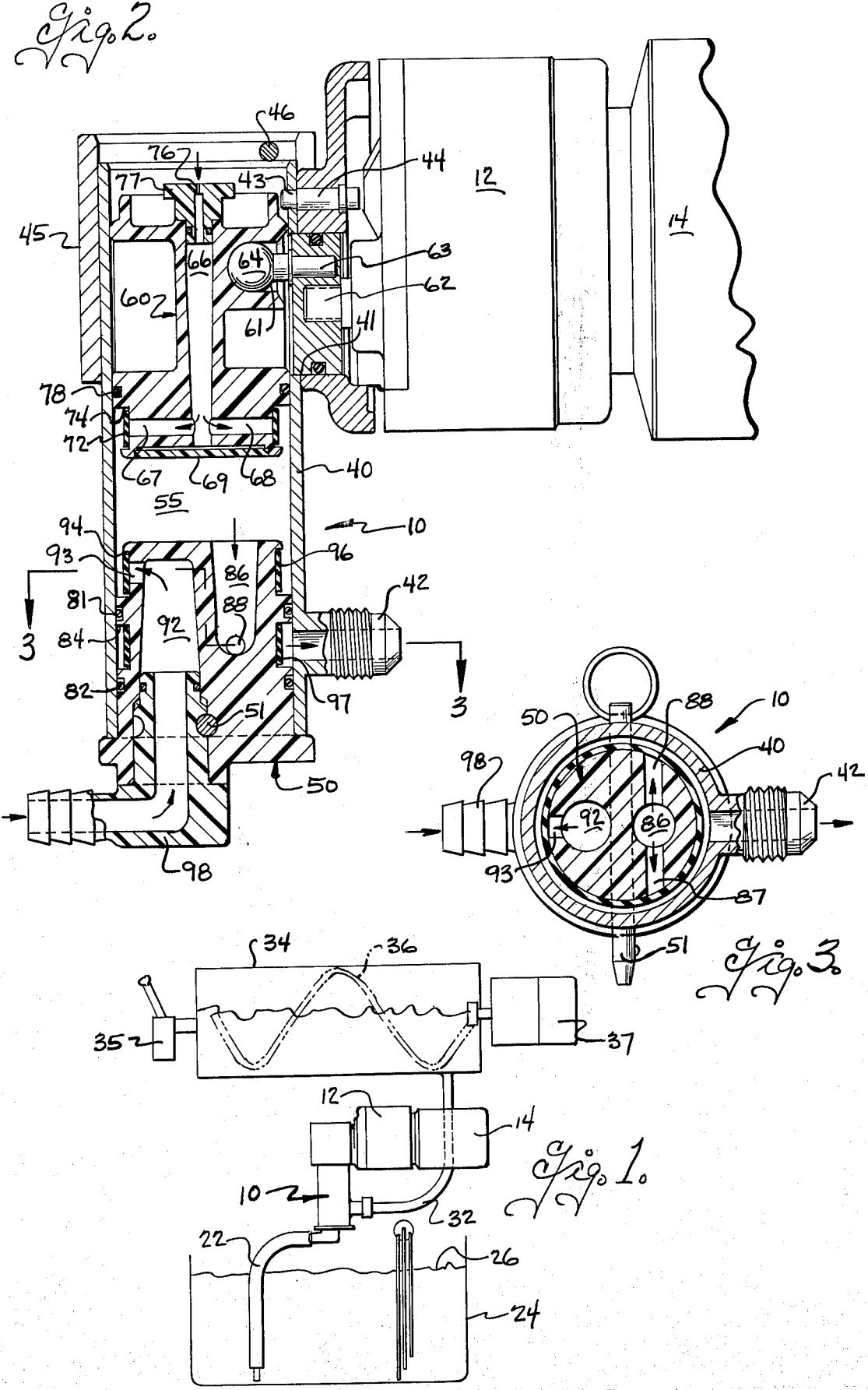

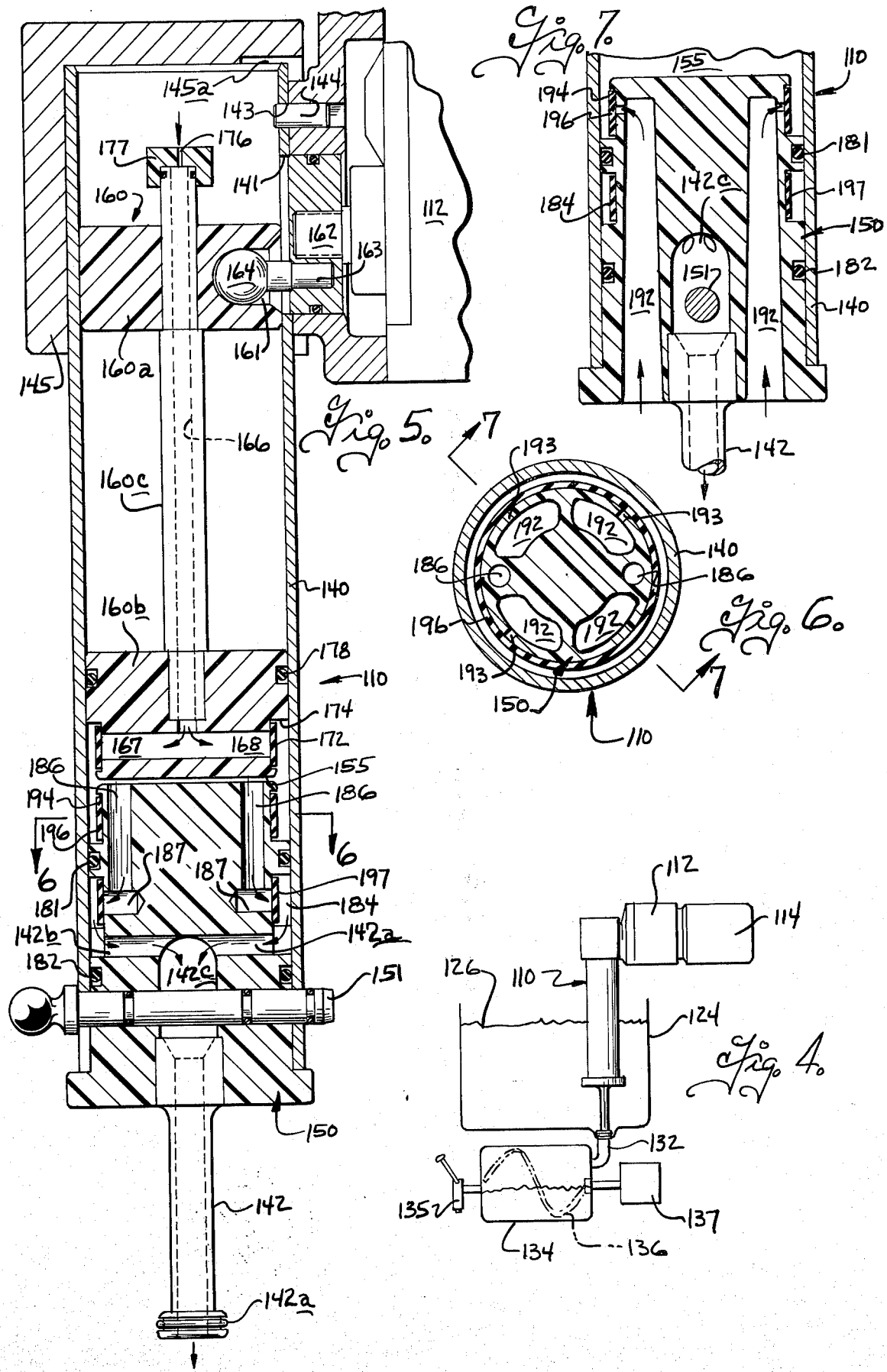

SINGLE-STAGE PROPORTIONING PUMP

BACKGROUND:

The invention pertains generally to pumps and more particularly to a single-stage proportioning pump.

The rapid dispensing of semifrozen confection food products of consumable quality requires that the proportioning equipment producing such foods mix the constituent ingredients accurately and uniformly in proper ratios. For example, some semifrozen confection food products are produced by mixing a prepared, storable liquid with a measured quantity of air. Such products are commonly known as "soft ice cream" or the like, and are produced with combined proportioning and freezing apparatus. Some present semifrozen confection food machinery utilize a plurality of individual pumping, proportioning, and delivery elements.

Some prior dispensing apparatus for semi-frozen confection foods have used gear type pumps to mix the confection material with air. However, gear pumps have not afforded the degree of efficiency and added advantages provided by the present invention. Gear pumps have a high wear factor, requiring frequent replacement. The tolerance or small clearance between the gears in a gear pump prevents in-place cleaning, requiring that the pump be disassembled for maintenance The operation of the present piston-cylinder pump is not affected by the viscosity of the fluid, whereas the efficiency of a gear pump decreases with increase in viscosity.

Semifrozen confection food dispensers require thorough cleaning after each day's service. The pump units in such dispensers must be disassembled, hand washed, and then reassembled in the apparatus. Also, the several pump elements in present proportioning devices comprise numerous recesses and joints where bacteria have a tendency to accumulate.

U.S. Pat. No. 3,787,145 issued Jan. 22, 1974 to R. M. Keyes and B. S. Nelson, the present inventors, discloses a double-acting proportioning pump which overcome the objections found in the prior art. That pump, however, was not easily disassembled and reassembled as is preferable for daily cleaning. Additionally, the pump housing was arranged to reciprocate thereby requiring all line connections to move. It is desirable to provide a pump of simplified construction which overcomes the prior art problems.

SUMMARY

The present invention relates to a single-stage proportioning pump which sucks in air and liquid comestible simultaneously.

It is a general object of the present invention to provide a proportioning pump which is compatible with the production of food products.

Another object is to provide a pump which is of simplified construction and which can be readily disassembled for cleaning and reassembled.

Still another object of this invention is to provide a proportioning pump in which all connections are stationary.

It is another object of this invention to provide a pump which sucks in air and liquid comestible simultaneously and which has the air inlet located so that the liquid does not adversely affect its operation.

Another object is to provide a single-stage proportioning pump which delivers a mixture of air and liquid comestible in a system.

These, and other objects and advantages of the present invention, will become apparent as the same becomes better understood from the following detailed description when taken in conjunction with the accompanying drawings.

DRAWINGS:

FIG. 1 is a diagrammatic view showing a first embodiment of the present invention incorporated in a machine having a freezing chamber with a bottom feed inlet;

FIG. 2 is a vertical sectional view through the pump illustrated in FIG. 1;

FIG. 3 is a cross-section taken along broken line 3—3 of FIG. 2;

FIG. 4 is a diagrammatic view showing a second embodiment of the present invention incorporated in a machine having a freezing chamber with a top feed inlet;

FIG. 5 is a vertical sectional view through the pump illustrated in FIG. 4;

FIG. 6 is a cross-section taken along line 6—6 of FIG. 5; and

FIG. 7 is a fragmentary vertical section taken along line 7—7 of FIG. 6.

DESCRIPTION:

Referring to FIG. 1, the pump 10 is attached to a gear box 12 driven by motor 14. A liquid inlet line 22 leads to the pump from a reservoir 24 which holds a liquid comestible 26 of the type used to make soft ice cream or the like. An outlet line 32 leads from the pump 10 to a freezing compartment 34. As is conventional, the freezing compartment has an outlet 35 and a scraper blade 36 driven by a motor 37. The blade operates to scrape the frozen comestible off the inside surface of the freezing compartment 34 and also operates to entrain the air in the comestible thereby forming an aerated semifrozen comestible or soft ice cream or the like.

As shown in FIGS. 2 and 3, pump 10 includes a hollow upright cylinder 40 which is preferably made of stainless steel and which has a laterally extending outlet connection 42 for connection to line 32. The cylinder is advantageously mounted on the gear box 12 by means of an opening 43 which mates with a pin 44 on the gear box. A stainless steel cap 45 fits over the top of the cylinder 40 and has a shoulder (not shown) which interfits with a shoulder (not shown) on the gear box to hold the pin 44 in opening 43. In this embodiment the cap 45 is open at the top to allow air to the air inlet (hereafter described), and has a removable pin 46 which engages the top of cylinder 40 to hold the cap in position.

An end plug 50 is located at the bottom of cylinder 40 and provides a closure therefor. It is advantageously made of a polyacetal such as sold under the trademark "Delrin," and is held in place by a keeper pin 51 passing through it and the cylinder 40. A piston 60 is located at the top of the cylinder and cooperates with the plug 50 to form a chamber 55 which expands and contacts as the piston is driven. As shown in FIG. 2, the piston is at its upper most position. The piston is preverably formed of a low friction material such as the aforementioned acetal resin and has a socket 61 formed therein. The cylinder 40 has an opening 41 adjacent the socket 61. The gear box 12 has a rotating drive shaft 62 which drives a crank arm 63 which extends through the cylinder opening 41. At the outer end of arm 63 is a ball 64 disposed in piston socket 61. In this manner, the piston 60 is reciprocated as the motor 14 drives gear box 12, and this operates to alternately expand and contract chamber 55 to provide suction and compression strokes.

Piston 60 has an axially disposed air inlet passageway 66 having lateral branches 67, 68 at the lower end. An end member 69 provides a closure so that the branches are the only outlets of the air passageway. A check valve in the form of a resilient band 72 is disposed in a groove 74 at the bottom of the piston and covers the outlet of branches 67, 68. Thus air is allowed into chamber 55 during the suction stroke and the band prevents product from entering the air passageway during the compression stroke. The quantity of air is controlled by an orifice 76 in a removable and replaceable member 77 at the inlet to passageway 66. In the preferred embodiment, the orifice 76 will be in the range of 0.015 inch to 0.050 inch (0.38mm to 1.4mm). An O-ring 78 is located above the band 72 to provide a seal between the piston and cylinder.

End plug 50 has sealing means in the form of vertically spaced O-rings 81, 82 for circumferentially sealing against the cylinder 40. A circumferential recess 84 is located between the O-rings 81, 82 and communicates with outlet connectionn 42. An outlet passage 86 having lateral branches 87, 88 leads from the chamber 55 to the recess 84. A liquid inlet passageway 92 leads from the bottom of the plug 50 and has a branch 93 which terminates at another recess 94 located above O-ring 81, and hence is in communication with chamber 55. Check valves in the form of resilient bands 96, 97 are disposed in recesses 94 and 84, respectively. Band 96 covers the outlet of branch 93 and operates to allow liquid to flow into chamber 55 during the suction or intake stroke and to close during compression. Conversely, band 97, which covers the outlet of branches 87, 88, close during suction, but allows flow of liquid and air to outlet connection 42 during the compression or dispensing stroke.

A male coupling 98 fits into liquid inlet passageway 92 and is held therein by a keeper pin 51. Coupling 98 is arranged for connection to the liquid inlet line 22 as seen in FIG. 1.

Preferably, O-rings 78, 81 and 82 are made of elastomeric material such as neoprene or Buna-N and are all the same size so they are interchangeable. Likewise, bands 72, 96 and 97 are preferably made of the same elastomeric material and are also the same size and interchangeable. This aleviates some of the problem in reassembling the pump after disassembly for cleaning.

The pump 10 is readily dismounted and disassembled. To dismount the pump, cap 45 is removed and the pump housing 40 moved away from pin 44 and lines 22 and 32 are disconnected. Removal of keeper pin 51 allows coupling 98 and plug 50 to be separated from housing 40. Piston 60 can then be pushed out the bottom of the cylinder 40 and member 77 is readily removable from it. The O-rings and bands are also easily removed and all parts can then be separately cleaned.

Referring to the embodiment in FIGS. 4–7, parts performing the same function as those described above are identified by numerals one hundred greater than the embodiment of FIGS. 1–3. This embodiment is designed to convert a machine of the gravity-feed type which has the freezing chamber 134 below the reservoir 124 and connected thereto by an outlet line 132. The cylinder 140 is elongated and has its lower end disposed in the liquid comestible 126. In this manner no liquid inlet line is needed since the pump can draw directly through the liquid inlet passageway 192 (see FIG. 7). The outlet connection 142 depends axially from the plug and has an O-ring 142a to fit in and seal against outlet line 132 (see FIG. 4). Recess 184 communicates with outlet connection 142 via passageways 142a, 142b leading to a central chamber 142c. In this embodiment there are plural outlet passages 186, as well as plural inlet passages 192, as seen in FIGS. 5 and 6.

Cap 145 extends over the top of cylinder 140 as shown in FIG. 5, and has a recess 145a to provide air access.

Piston 160 is elongated in this embodiment and has an upper portion 160a spaced from a lower portion 160b, so that the upper portion having the socket 161 is above the liquid level while the lower portion is closely adjacent the plug 150. The lowermost position of the piston is shown in FIG. 5 with chamber 155 at its smallest size. Portions 160a and 160b are interconnected by an axially disposed stainless steel rod 160c through which air inlet passage 166 extends. At the top of rod 160c is replaceable member 177 which has the orifice 176 therein.

This embodiment is dismounted by removing cap 145, pulling cylinder 140 away from pin 143 and then lifting the pump to remove the outlet connection 142 from outlet line 132. The various parts are disassembled in the manner described for the first embodiment.

While two embodiments have been disclosed and described, this has been by way of illustration and not limitation, and the invention should not be limited except as required by the scope of the appending claims.

The embodiments of the invention is which an exclusive property or privilege is claimed are defined as follows:

1. In a machine for dispensing an aerated semifrozen comestible, the machine having a reservoir for holding a liquid comestible to be pumped, a single-stage proportioning pump which pumps air and liquid simultaneously, a motor for driving the pump, a freezing compartment for receiving the liquid comestible and air, and means in the freezing compartment for scraping the frozen comestible off the surface thereof and for entraining the air in the comestible; characterized by the pump including:

a hollow upright cylinder having top and bottom ends; a plug at the bottom of the cylinder; a reciprocable piston in the cylinder above the plug and therewith defining an expansible and contractable chamber; drive means providing a driving connection between the piston and motor to reciprocate the piston and alternately provide suction and compression on the chamber; an air inlet passage through said piston communicating the chamber with atmosphere; a resilient band check valve on the piston and associated with the air inlet passage to allow air into the chamber during suction and to prevent escape of the air during compression; means including a liquid inlet passageway through the plug for communicating the chamber with the reservoir; a check valve associated with the liquid passageway to allow liquid comestible into the chamber during suction and to prevent escape of the liquid comestible during compression; first and second sealing means on the plug for circumferentially sealing against the inside of the cylinder; a circumferential recess in the plug between the first and second sealing means; an outlet passage leading from the chamber to the recess; outlet conduit means connecting the recess with the freezing compartment; and a resilient band check valve in the recess and associated with the outlet passageway to allow the liquid comestible and air to flow from the chamber to the conduit means during compression on the chamber and to close during suction on the chamber.

2. The combination of claim 1 including means defining an orifice at the inlet to the air inlet passage to limit the amount of air introduced during suction on the chamber.

3. The combination of claim 2 wherein the cylinder has an opening therethrough adjacent the piston, the piston has a portion formed of synthetic resin having friction characteristics similar to polyacetal and a socket formed in said portion, and the drive means includes an arm extending through the cylinder opening and a ball on the end of the arm and disposed in the piston socket.

4. The combination of claim 2 wherein the reservoir has an outlet in its bottom leading to the freezing compartment disposed beneath it, the cylinder has its bottom end submersed in the liquid comestible, the outlet conduit means depends axially of the plug and extends into the reservoir outlet, and seal means on the outlet conduit means to provide a closure for the reservoir outlet.

5. The combination of claim 4 wherein the cylinder is elongate with its top end above the reservoir, the piston has a lower portion adjacent the plug and an upper portion adjacent the top end of the cylinder, said upper portion has the driving connection to the drive means, a rod interconnects said upper and lower portions, and the air inlet passage extends through the rod.

6. The combination of claim 2 in which the means for communicating the chamber with the reservoir includes a male coupling inserted into the liquid inlet passageway in the plug, and including means for removably mounting the coupling thereat.

7. In a machine for dispensing an aerated semifrozen comestible, the machine having a reservoir for holding a liquid comestible to be pumped, a single-stage proportioning pump which pumps air and liquid simultaneously, a motor for driving the pump, a freezing compartment for receiving the liquid comestible and air, and means in the freezing compartment for scraping the frozen comestible off the surface thereof and for entraining the air in the comestible; characterized by the pump including:

a hollow upright cylinder having top and bottom ends; a plug at the bottom of the cylinder; a reciprocable piston in the cylinder above the plug and therewith defining an expansible and contractable chamber; the cylinder having a side opening therethrough adjacent the piston; the piston having a socket at said opening; drive means between the motor and pump and including an arm extending through said opening and a ball in said socket; the drive means being operative to reciprocate the piston and alternately provide an intake stroke and an exhaust stroke; an air inlet passageway through the piston communicating the chamber with atmosphere; means including a liquid inlet passageway through the plug for communicating the chamber with the reservoir; means including an outlet passageway through the plug for flow of the liquid and air from the chamber to the freezing compartment; and valve means associated with each said passageway to allow flow of liquid and air into the chamber during the intake stroke while preventing flow through the outlet and vice versa during the exhaust stroke.

8. The combination of claim 7 wherein the drive means includes a drive housing, and including means for removably mounting the cylinder on the drive housing.

9. The combination of claim 8 including a fastener for removably mounting the plug in the cylinder, and wherein the piston is removable when the plug is removed, whereby the pump is readily disassembled for cleaning.

10. The combination of claim 9 including first and second sealing means on the plug for circumferentially sealing against the inside of the cylinder; a first circumferential recess in the plug between the first and second sealing means; and a second circumferential recess in the plug above the uppermost sealing means; and wherein the outlet passageway terminates at the first recess and the liquid inlet passageway terminates at the second recess.

11. The combination of claim 10 wherein the piston has a circumferential recess adjacent its lower end; and the air inlet passageway terminates at said recess; and including a single sealing means above said recess for circumferentially sealing against the inside of the cylinder.

12. The combination of claim 11 wherein the valve means associated with each passageway is a resilient band disposed in each circumferential recess; each recess and each band being of identical size so that the bands are interchangeable; and wherein each sealing means is an O-ring of elostomeric of idential size so that they are also interchangeable; whereby the bands and O-rings are readily removable for cleaning and interchangeably replaceable.

* * * * *